Patented Sept. 12, 1944

2,357,944

UNITED STATES PATENT OFFICE 2,357,944

PROCESS FOR ISOLATION OF ANTIHEMOR-
RHAGIC PRINCIPLES AND PRODUCTS OB-
TAINED THEREBY

Louis F. Fieser, Belmont, Mass., assignor to Research Corporation, New York, N. Y., a corporation of New York No Drawing. Application September 11, 1939,
Serial No. 294,318

5 Claims. (Cl. 260—396)

The invention described relates to new and efficient processes for the isolation and production of the antihemorrhagic principles occurring in small amounts in alfalfa and other green plants, in various forms of bacteria, and in fish meals, and generally known as vitamin K principles. Among these principles are the vitamins $K_1$ and $K_2$ from alfalfa and from putrefied sardine meal, respectively, described by Doisy, Karrer, and others. My process pertains particularly to the isolation of such vitamin K principles in a state of purity from concentrates of the natural vitamins or from synthetic mixtures containing vitamins contaminated with by-products and (or) with materials used in the synthesis. My new process makes it possible to separate the anti-hemorrhagic principles very readily from natural or synthetic mixtures, whether the active substance is present in preponderant amount or only to a very minor extent.

The vitamin K principles are quinones, and heretofore the only methods for their isolation described or mentioned in the literature involve processing the substances in the quinone form. I have discovered, however, that the substances can be isolated very easily by first converting them into their hydroquinones by reduction and by taking advantage of certain specific properties of these hydroquinones. Thus 2-methyl-3-phytyl-1,4-naphthoquinone, A, can be reduced readily to much less soluble in this solvent and can be caused to separate as a solid and leave the impurities in solution. While the quinone A is very sensitive to the action of alkalies, particularly alcoholic alkalies, the hydroquinone is stable to these reagents in the absence of air, and is stable in the presence of air when under protection from a suitable reducing agent, such as sodium hydrosulfite. The substance B, furthermore, can be extracted from a petroleum ether solution containing other substances with the use of Claisen's methyl alcoholic alkali solution, consisting of a solution of 350 g. of potassium hydroxide in 250 cc. of water, diluted to a volume of 1 liter with methanol, and hereafter referred to as Claisen's alkali. The hydroquinone B, and other substances of the same type, dissolves in Claisen's alkali to give a characteristic yellow solution, the color affording a convenient index of the isolation process. The hydroquinone is not soluble in aqueous alkali, and when the yellow Claisen liquor extract is diluted with water in the presence of ether the hydroquinone of the type B passes into the ether phase.

Once the hydroquinone of the type B has been separated from other substances by virtue of the specific properties enumerated, it can be further purified, if desired, by a repetition or combination of the two procedures and then reconverted into the quinone of the type A by treatment in solution in ether, petroleum ether, or other solvent

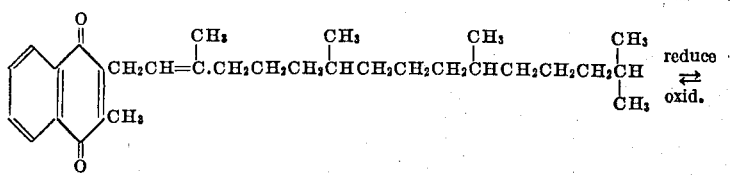

(A)

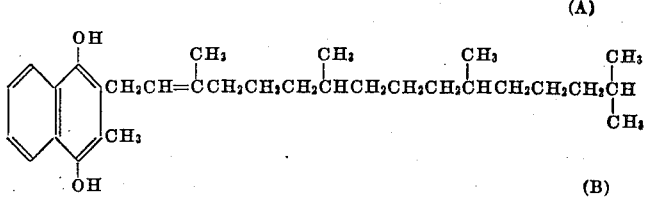

(B)

the hydroquinone B, and the chemical change is attended with a pronounced change in chemical and physical properties presenting certain advantages for purposes of isolation. Thus the quinone A is readily soluble in low-boiling petroleum ether, like substances which ordinarily accompany it in both concentrates from natural sources and synthetic mixtures, whereas B is with a suitable reagent such as silver oxide, mercuric oxide, ferric chloride, or air.

I have found that 2-methyl-3-phytyl-1,4-naphthoquinone can be isolated in a pure condition by the process described from the mixtures resulting from the condensation of 2-methyl-1,4-naphthohydroquinone with phytol in the presence of anhydrous oxalic acid or trichloroacetic acid in solution in dioxane or ethylene glycol dimethyl ether. I have found that the corresponding 2-ethyl derivative can be obtained in a similar way in a substantially pure condition. I have also found that the natural vitamin $K_1$ of alfalfa can be isolated in a pure condition from concentrates containing but a few percent of the material.

While the general processes described herein for preparing the hydroquinones of vitamin K principles and separating them from various mixtures are particularly useful for the purpose of isolating the anti-hemorrhagic principles, this is but one important application of the discovery. Another significant feature of my invention is that it provides a means of preparing the hydroquinone (or dihydro) derivatives of natural and synthetic vitamin K principles in a pure and anhydrous condition suitable for use in the preparation of numerous stable derivatives such as esters and ethers.

Examples (1) *Isolation of natural vitamin $K_1$.*—In a typical example the starting material used is a petroleum-ether soluble concentrate containing 3–5% vitamin prepared by the process described by Riegel, Schweitzer and Smith, J. Biol. Chem., 129, 495 (1939). A 5.32 g. portion of this material is suspended in 90 cc. of alcohol (95% ethyl alcohol), an aqueous solution of 4.5 g. of sodium hydrosulfite in 30 cc. of water is added, and the mixture containing oil droplets and precipitated salts is shaken vigorously in a stoppered container for 10 minutes. After adding 50 cc. of water, which dissolves the salts, the mixture is shaken again for 10 minutes, diluted further with water, and the organic material is then extracted with petroleum ether (B. P. 20–40°, about 100 cc.). The weekly yellow petroleum ether solution is washed with water and then shaken thoroughly with an equal volume of 5% potassium hydroxide containing 1–2% of sodium hydrosulfite, and the aqueous layer is separated and discarded. The petroleum ether solution is then extracted with 50 cc. of Claisen's alkali to which is added 3 cc. of a saturated aqueous solution of sodium hydrosulfite, the alkaline liquor acquiring a bright yellow color characteristic of the salt of the vitamin hydroquinone. The yellow alkaline layer is drawn off into a separatory funnel containing 50 cc. of ether, and two or three further extractions are made until the Claisen alkali no longer acquires a distinct yellow color. The total yellow alkaline liquor is then washed once with ether, adding a little petroleum ether, if required, to facilitate the settling of the ether layer. If darkening occurs in the ether layer due to oxidation, more hydrosulfite solution is added. The washed alkaline liquor is then run into another separatory funnel containing 50 cc. of ether and diluted with 2–3 volumes of a dilute aqueous solution (2–4%) of sodium hydrosulfite. This causes the disappearance of the yellow color in the alkaline layer for the vitamin hydroquinone is liberated from its salt. On shaking the mixture the hydroquinone passes into the ether layer to give a pale yellowish solution. After discarding the alkaline layer the ethereal solution is washed with 2–4% aqueous hydrosulfite solution, then with water and evaporated by gentle heating, eventually at the water pump. There is obtained 170 mg. of a reddish brown oil which becomes waxy on cooling. It is treated with 10 cc. of petroleum ether, when the vitamin hydroquinone separates as a white solid. Any brown lumps of wax are disintegrated by rubbing and warming, and the suspension is then cooled in an ice bath and centrifuged. The vitamin hydroquinone settles as a white paste from which the brownish supernatant liquor is decanted. The paste is stirred with fresh petroleum ether, cooled, and centrifuged, and the white solid is then dissolved in dry ether and oxidized by shaking for 30 minutes with 0.5 g. each of silver oxide and anhydrous magnesium sulfate. The solution is filtered and evaporated, eventually under vacuum, giving 60 mg. of a pure yellow, rather mobile oil. This consists in very pure vitamin $K_1$.

Anal. calcd. for $C_{31}H_{46}O_2$: C, 82.61; H, 10.29. Found: C, 82.64; H, 10.20.

The vitamin isolated by this process shows definite anti-hemorrhagic activity in the test with chicks at a dosage level of 2–4γ. It gives an intense color in the Dam-Karrer test with alcoholic alkali. The ultraviolet absorption spectrum shows maxima at 241, 248, 263, 271, and 328 mu. Reductive acetylation with acetic anhydride, zinc dust and pyridine gives dihydro vitamin $K_1$ diacetate, which when crystallized from methanol melts at 58.5–60° and gives no depression when mixed with synthetic 2-methyl-3-phytyl-1,4-naphthohydroquinone diacetate.

(2) *2-methyl-3-phytyl-1,4 - naphthohydroquinone from the synthetic quinone.*—A suspension of 0.42 g. of pure 2-methyl-3-phytyl-1,4-naphthoquinone in 10 cc. of alcohol is treated with 0.5 g. of sodium hydrosulfite in 3 cc. of warm water and the mixture shaken vigorously for a few minutes in a stoppered flask until the droplets of yellow oil have all disappeared. Water (5 cc.) is added and the mixture shaken again, giving a suspension of the hydroquinone as a colorless solid. The material may be collected at this point in an atmosphere of nitrogen, but when moist with water or alcohol the substance is highly sensitive to oxidation by the air. It is therefore advantageous to obtain the material in an anhydrous condition as described below.

The suspension is diluted further with water (5 cc.), extracted with petroleum ether (B. P. 20–40°, 15–20 cc.), and the organic layer is extracted with one-third its volume of Claisen's alkali to which aqueous hydrosulfite is added as in Example 1. This extract is bright yellow and a second similar extraction removes the last traces of the hydroquinone. The alkaline liquor (drawn off under ether) is washed with ether, as in (1), diluted with hydrosulfite solution, and the hydroquinone extracted with ether. The ethereal solution is washed with 2–4% hydrosulfite solution and with water, dried and evaporated, removing traces of solvent in vacuum. The hydroquinone is left as a wax which has a slightly brownish color due to traces of oxidation products (the quinone and the quinhydrone) formed in the course of processing the material. The color is completely removed, however, by digesting the wax with petroleum ether and collecting the resulting white solid by centrifugation as described in Example 1. The hydroquinone is thus obtained in a highly pure condition as a white paste in petroleum ether. In this condition, and when covered with a little of the solvent mentioned, it may be manipulated or kept for several hours without protection from the air. When placed in a stoppered container from which air is excluded it may be kept indefinitely without undergoing alteration.

If pure quinone is used the yield of the hydroquinone is very nearly quantitative. Thus in the example cited the purified material was oxidized with silver oxide to 2-methyl-3-phytyl-1,4-naphthoquinone, and there was obtained 0.37 g. of very pure, clear yellow product showing color tests characteristic of material of the best quality (pure indigo blue, changing to purple, then dull red with 5% alcoholic potassium hydroxide; complete discharge of color when an ethereal solution is shaken with aqueous hydrosulfite solution).

The above procedure may be used for the preparation of the pure hydroquinone starting with a crude mixture such as that resulting from the condensation of methylnaphtho-hydroquinone with phytol as previously described, and in this case the step of extraction with Claisen's alkali may be omitted without disadvantage. If contaminants other than those of the synthetic mixture are present, this extraction step may be desirable. If no weakly acidic substances other than the hydroquinone are present, for example such as a tocopherol, extraction with Claisen's alkali alone is sufficient to give a pure product and digestion with petroleum ether is not required (provided, of course, that any alkali-soluble phenols or acids are first removed by extraction with aqueous alkali).

(3) *2-ethyl-3-phytyl - 1,4 - naphthoquinone.—*
4.8 g. of 2-ethyl-1,4-naphthohydroquinone is heated with 1.48 g. of phytol and 1 g. of anhydrous oxalic acid in 15 cc. of dioxane for 24 hours at 75°. After dilution with water, extraction with ether, and removal of the unchanged ethylnaphthohydroquinone with 2% alkali containing hydrosulfite, the ethereal solution is dried and the solvent evaporated. There is obtained 1.85 g. of brown oil containing ethyl-phytyl-naphthohydroquinone, probably contaminated with the isomeric tocopherol, phytol, phytadiene and other products. The desired hydroquinone is so soluble in petroleum ether that it does not separate when the oil is taken up in this solvent, as with the methyl homologue. Consequently, the product is extracted from a petroleum ether solution with Claisen's alkali as described in Examples 1 and 2 and recovered by dilution with water and extraction with ether. Evaporation of the ether gives 0.46 g. of a brownish oil consisting largely of the hydroquinone, but even in this purified condition the substance does not separate from petroleum ether solution. It is therefore oxidized by shaking with silver oxide in petroleum ether or ether solution and the filtered yellow solution evaporated. For further purification the resulting quinone is dissolved in 20 cc. of petroleum ether and the solution extracted with two 20 cc. portions of 90% methanol (by volume). The quinone remains largely in the petroleum ether phase, although the presence of small amounts in the lower layer is shown by a weak positive color test with alcoholic alkali, but the remaining impurities are largely eliminated. Evaporation of the dried petroleum ether solution then gives 0.33 g. of 2-ethyl-3-phytyl-1,4-naphthoquinone as a reddish yellow oil. This gives a strong Dam-Karrer color test. Similarly the process may be applied for the separation and purification of the 2-methyl-3-geranyl-1,4-naphthohydroquinone and the 2 - methyl - 3 - farnesyl-1,4-naphthohydroquinone.

These examples are given by way of illustration and not of limitation, as it is obvious that certain modifications may be made in the steps of these processes, and in the kinds and proportions of the materials employed, without departing from the spirit and scope of the invention and the purview of the claims.

This application contains subject matter in common with my application Serial No. 294,317, filed September 11, 1931.

I claim as my invention:

1. A process for the isolation of the antihemorrhagic vitamin principles present as quinones in mixtures which are soluble in low-boiling petroleum ether comprising the steps of first converting the said quinone principles into their corresponding hydroquinones by reduction, treating with low-boiling petroleum ether in which the hydroquinones are less soluble than the original quinones and accompanying impurities, separating the hydroquinones as solids, leaving the impurities in solution and removing traces of impurities from the solid hydroquinones by further washing with petroleum ether.

2. A process of preparing the hydroquinone derivatives of antihemorrhagic vitamin principles in a substantially pure and anhydrous condition, consisting in converting the said vitamin principles into hydroquinones by reduction, treating with low boiling petroleum ether in which the hydroquinones are less soluble than impurities accompanying the said vitamin principles, separating the hydroquinones as solids and leaving impurities in solution.

3. A process for the isolation of the antihemorrhagic vitamin principles present as quinones in mixtures which are soluble in low-boiling petroleum ether comprising the steps of first converting the said quinone principles into their corresponding hydroquinones by reduction, extracting the hydroquinones from petroleum ether with Claisen's methyl alcoholic alkali solution, treating with low-boiling petroleum ether in which the hydroquinones are less soluble than the original quinones and accompanying impurities, separating the hydroquinones as solids, leaving the impurities in solution and removing traces of impurities from the solid hydroquinones by further washing with petroleum ether.

4. Process for the isolation of synthetic antihermorrhagic principles as defined in claim 1 in which unchanged 2-alkyl-1,4-naphthohydroquinone is removed from the reaction mixture after reduction to the hydroquinone by extraction from ether with alkaline sodium hydrosulfite solution.

5. In a process for isolating 2-methyl-3-phytyl-1,4-naphthoquinone, the step which comprises chilling a petroleum ether solution containing 2-methyl-3-phytyl-1,4-naphthohydroquinone to a temperature sufficient to cause the precipitation of the 2-methyl-3-phytyl-1,4-naphthohydroquinone.

LOUIS F. FIESER.